Feb. 17, 1953     F. RIEBER     2,628,689
DYNAMIC SCANNING SYSTEM

Filed May 28, 1949     3 Sheets-Sheet 1

INVENTOR,
FRANK RIEBER, DECEASED.
LU GARDA RIEBER, EXECUTRIX.
BY
Lippincott & Smith
ATTORNEYS.

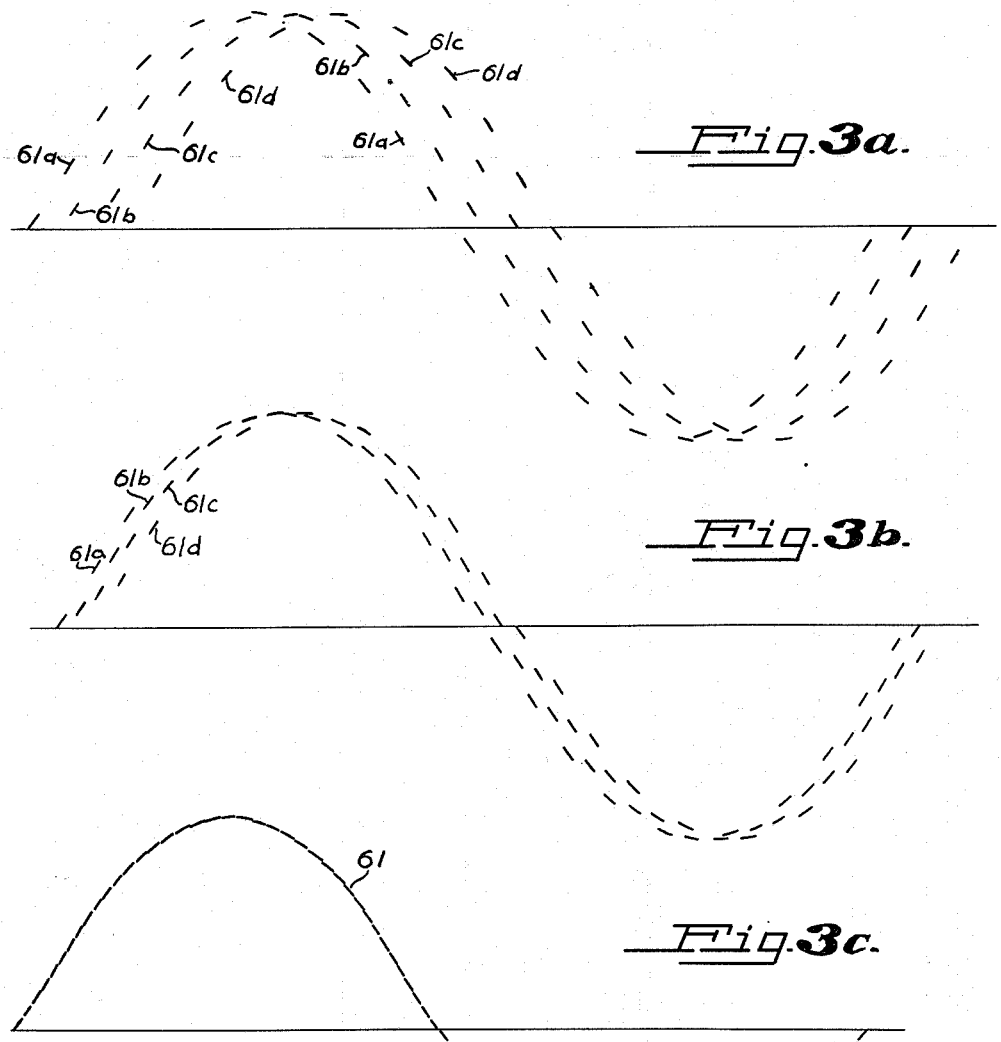

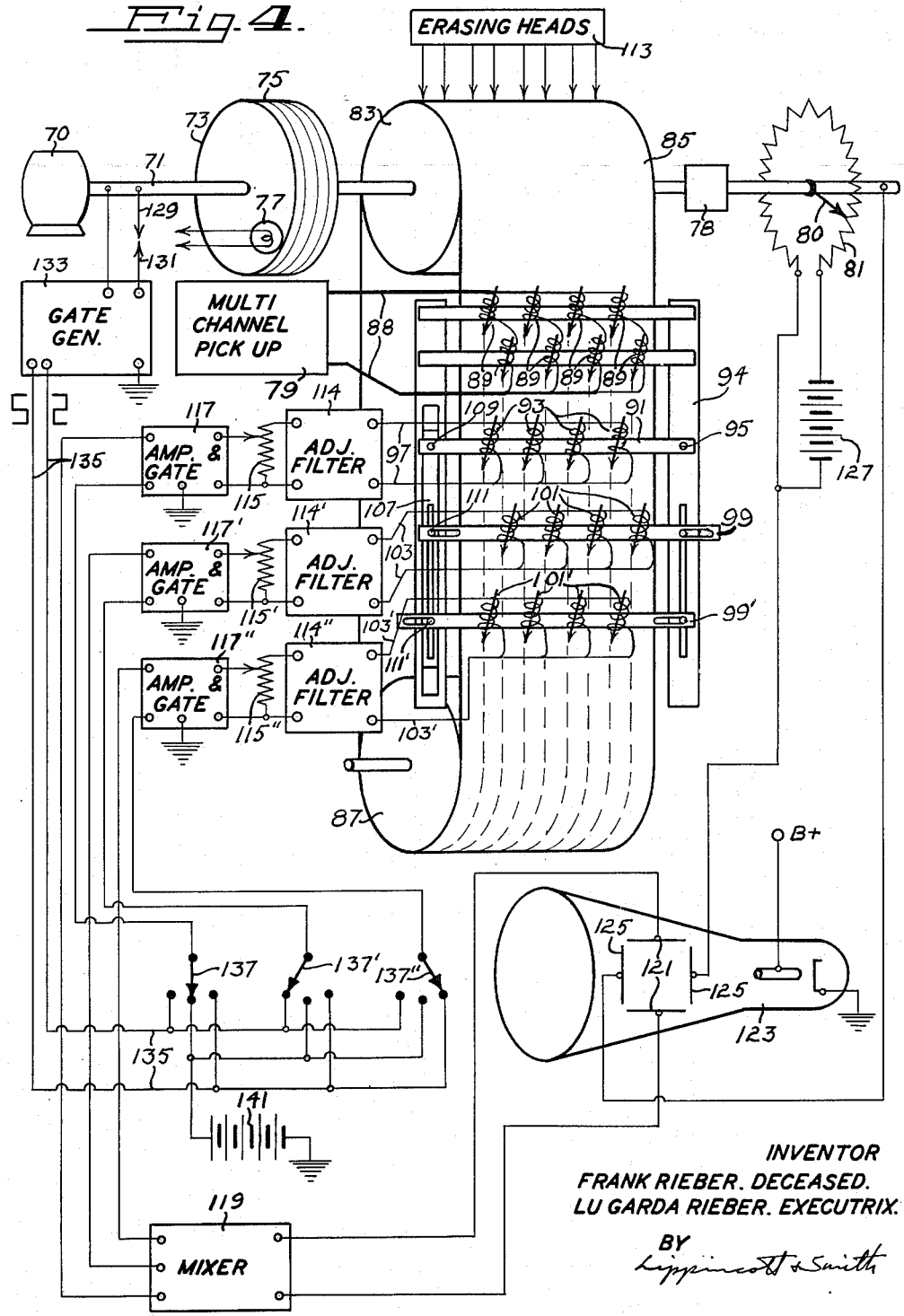

Patented Feb. 17, 1953

2,628,689

UNITED STATES PATENT OFFICE 2,628,689

DYNAMIC SCANNING SYSTEM

Frank Rieber, deceased, late of New York, N. Y., by Lu Garda Rieber, executrix, New York, N. Y., assignor to Geovision Incorporated, a corporation of New York Application May 28, 1949, Serial No. 96,045

13 Claims. (Cl. 181—0.5)

This invention relates to methods of analysis of data recorded in the form of phonographically reproducible records, and specifically to the analysis of geophysical data comprising such records of seismic waves as so recorded from a plurality of receptors or geophones arranged in known spacial relationship to a "shot-point" at which occurred an explosion which initiated such waves.

Prior Patents Numbers 2,051,153 and 2,144,812 of this inventor disclosed the method of analysis which involved the making of phonographically reproducible records of the type here referred to, playing these records back simultaneously into a common circuit repeatedly and in varying time relationships, and forming, from each playback, a single curve or combined seismogram. In the apparatus shown in the prior patents combined seismographic curves were traced by a stylus or pen, the traces of a plurality of playbacks being formed side by side on a single strip of paper, each seismogram forming a permanent record. These records can then be compared, and knowing the time or phase relationship with which the playback from each of the phonographic records bore to each other in making each of the traces, much information as to the direction from which the reflected waves originally arrived at the geophones can be obtained. From the data thus derived the positions of the strata can be deduced and other information obtained which is concealed in the ordinary types of directly made seismograms.

The permanent records formed in accordance with the inventor's prior patents have certain very definite advantages. The combined seismograms, however, while usually considerably simpler in form than those picked up by a single geophone in accordance with older systems, are still extremely complex curves, and it requires careful study and measurement of these curves to determine the points at which maximum effects desired occur.

The prior patents mentioned also show how, by mixing with the original reproduced seismic wave, a second similar reproduction delayed by one-half wavelength and decreased in amplitude by an amount equivalent to the logarithmic decrement of the damped wave, the train of waves following the first impulse can be greatly reduced in amplitude and waves arriving from later reflections can be more easily detected. This procedure has been referred to in other applications of the same inventor as the "lambda-delta" correction and will be so referred to here.

Explosively originated seismic waves, although they form damped wave trains, are not simple or constant in frequency. As such waves travel through the earth their higher frequency components tend to be attenuated at a more rapid rate than those of lower frequency. Furthermore, it is not at all certain that the different frequency components travel through the various media which they encounter at the same speed. The waveforms reflected from strata of different depths therefore may differ materially, and their apparent wavelengths as recorded, as well as their actual wavelengths in the medium, may change as between earlier and later reflections, thus requiring that both the lambda or wavelength correction and the delta or damping correction differ, as between earlier and later recorded portions of the record, in order to give best results.

Furthermore, in examining and analyzing the data, much may sometimes be learned by filtering out wavelengths of higher or lower frequency and concentrating attention upon a relatively narrow band of frequencies among those produced by the explosion. Which bands give the most information in any given case depends upon various factors, and may also differ with the depth of the structures upon which attention is concentrated. Adjustable filters may therefore be used, or different filters substituted passing different bands of waves. The filters impose certain of their own characteristics upon the waves passed by them, and this also may change the optimum lambda-delta corrections.

In order to make a complete analysis of the records from any given terrain, therefore, a large number of parameters must be changed in various combinations and permutations, and this involves not only the making of a very large number of traces but also comparing traces which are inherently confusingly similar and wherein the detection of slight differences in otherwise similar traces may be necessary to yield critical information desired.

In accordance with the present invention, the data which have been recorded on a plurality of tracks are combined as described in the previously mentioned patents; instead of the phonographic reproduction being at the rate originally recorded, however, so that the traversal of any single record or group of records requires a period of from four to six seconds, the records are scanned at a much higher rate so that the wave trains produced are complete within a period which is preferably approximately that of the persistence of vision, or something on the order of a sixteenth of a second.

The combined waves thus generated are displayed upon an oscilloscope, preferably of the cathode ray type, against a time base substantially equal to that of the repetitive scanning of the phonographic records. The display surface of the oscilloscope therefore displays what appears substantially as a steady seismographic trace as long as the scanning parameters of the system are left unchanged. In accordance with the invention, however, provision is made for altering the scanning parameters, individually or simultaneously, and, preferably, by continuous gradations.

Under these latter circumstances the form of the curve displayed upon the oscilloscope changes gradually, and the point, or the approximate point, at which the particular effects occur which are being watched for can usually be clearly recognized. Even with the simplifications resulting from filtering and from applying the lambda-delta correction, however, the wave train, considered as a whole, is extremely complex, there are many cycles to examine, and the exact point of adjustment, as distinguished from the approximate point, where the best effects occur is not always easy to recognize. As an additional step, therefore, the wave trains resulting from scanning the records are divided into two series which are presented upon the oscilloscope alternately, the particular scanning parameter under immediate investigation being slightly different as between the two series. Means are provided for making the adjustments of the scanning parameters independently and individually with respect to each series of scanning, but preferably these adjustments are ganged so that the quantity being varied is changed by the same amount in both presentations, but is consistently slightly greater with respect to one of the series than it is with respect to the other.

With the adjustment thus made the two curves will be nearly but not quite identical, and the presentation upon the oscilloscope will flicker as between the two conditions, each successive presentation upon the oscilloscope screen acting as a norm against which the other can be measured. The difference between the two adjustments may be made as small as may be desired.

The resulting effect can be utilized in two ways: first, with a very small difference between the two presentations, one of the two may be adjusted to an absolute maximum of the effect desired, and the result of this adjustment can be recorded as a critical point in the analysis; second, the ganged adjustment can be varied until the deviations on both sides of the optimum are equal, in which case the critical analytical point will lie half way between the two adjustments. For certain purposes one of these methods of using the invention may be preferred, and for other types of analysis the other one may be. Both methods are useful, and both exceed greatly in accuracy anything that can be obtained by the comparison of static curves.

Practically every factor entering into the analysis of seismic records may be investigated in this fashion with improved results over former methods. For example, a wavefront arriving at the successive geophones in a linear array from a given reflective interface will be successively delayed in its times of arrival with respect to the more distant geophones as compared with the nearer ones. If the mixture of all of these waves is played back onto the oscilloscope screen in the same time relation as that in which they were recorded, the result of any individual train of waves will be a jumble without marked peaks. If, however, the playback of the combined records is altered in time-sequence, so that the earlier arriving waves are delayed by an amount equal to the relative delay of the same wavefronts as they arrived at the more distant geophones, and the playbacks from the intermediate records are delayed by proportional amounts, all of the waves corresponding to that particular reflection will reinforce each other and produce a single curve corresponding in shape quite closely to the curve from any single geophone but greatly increased in amplitude.

The amount of the delay to be applied to the waves from the various geophones is a function of direction, and waves arriving from other directions will not reinforce in the same manner but will have a random distribution. Noise, which is inescapable in geophone pickups, will also be random, and will not produce any systematic reinforcement. As the relative delays are varied as between the various records, the amplitude of the combined wave grows very rapidly as coincidence begins to be approached, but the growth is less rapid as the final stage of coincidence is reached, and there is a certain degree of uncertainty about the angle where complete coincidence occurs. The flicker resulting from the method of this invention enables the resolution of this uncertainty with a high degree of precision. Similarly, the best adjustments for the lambda and delta corrections can be arrived at, not only with respect to the entire train of waves, but also with respect to any individual portion of such train.

It should be understood that in varying the different parameters the critical adjustment is not always indicated by a maximum ampliude; it may be signified by a minimum amplitude, by a smoothing out of a complex curve, or by the collection of a group of apparently unrelated partial traces into a single curve. In connection with all of these effects, however, the flicker effect is of great assistance in determining where the best adjustment lies.

The invention will be more clearly understood in connection with the following detailed description of various embodiments, taken in connection with the accompanying drawings, wherein.

Figure 1:
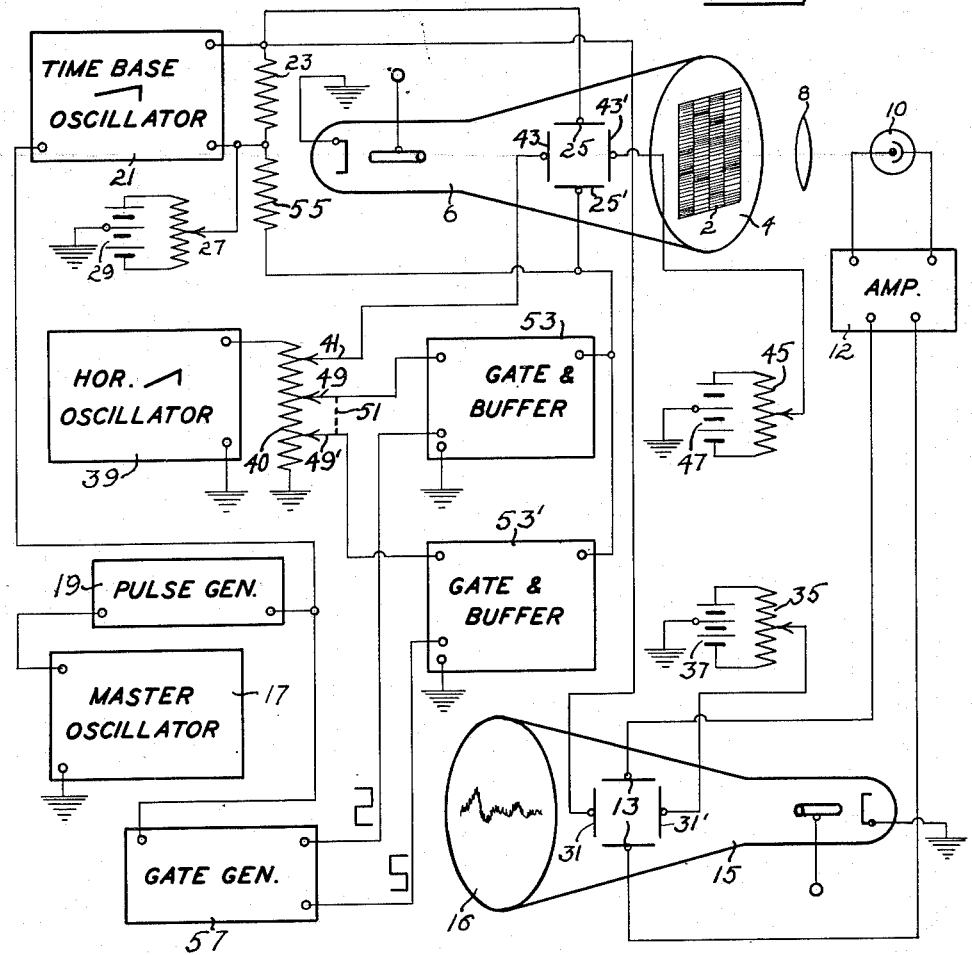
Fig. 1 is a diagram, largely in block but partly in schematic form, showing an embodiment of the invention wherein the plurality of phonographically reproducible tracks are scanned by a sampling method utilizing the "flying spot" system of scansion.

Figs. 3a, 3b and 3c are graphs illustrating the traces on the display surface of the oscillograph produced by a sine wave played back by the equipment of Fig. 1 with various degrees of delay; and Fig. 4 is a partially schematic and partially block diagram of an embodiment of the invention employing continuous rather than sampling type of scanning and wherein the results of varying a plurality of parameters, simultaneously or successively, may be compared.

The results to be accomplished by the equipment illustrated in Fig. 1 can best be understood by first considering the nature of the phonographically reproducible records to be analyzed and the results which it is desired to achieve.

Ordinarily each of the phonographic tracks records wave trains from a large number of reflecting interfaces. The results to be achieved can, however, be sufficiently explained by considering what occurs in the case of a single reflection, and this is indicated diagrammatically in Fig. 2. This figure represents a vertical cross section through a terrain comprising a weathered layer 1 and strata 3 and 5, which strata have different characteristics with respect to the propagation of waves and therefore form, between them, a reflecting interface 7. An explosive charge is placed at a shot-point 9, preferably below the weathered layer. An array of geophones 11a, 11b, 11c and 11d is placed in carefully surveyed positions relative to the shot-point 9, and preferably alined therewith. Usually the geophones are located within or over the weathered layer, so that "weathering corrections" should be applied in making or reproducing the recordings by various methods which are known.

When the explosion takes place a wavefront is propagated from the shot-point in all directions, and, upon striking the interface 7, a portion thereof is reflected toward the geophone array and the resulting vibrations are picked up by the geophones 11a to 11d as the wavefront reaches them. Reflections follow the well-known specular law, i. e., the angles of incidence and reflections are equal. The reflected wavefront, as it arrives at the geophones, is equivalent to that of a wave originating at the point 9', located upon the perpendicular 13 dropped from the point 9 to the interface 7, and a distance below the interface equal to that of the point 9 above it.

The wavefront 14 first reaches the receptor or geophone 11a, advancing to reach geophones 11b to 11d after increasingly greater delays. Since it is the same wavefront that affects all of the geophones, phonographic records made of the waves will be substantially identical in form (although perhaps slightly more attenuated in the cases where the travel has been greater) but these records will be displaced along the time axis.

If each of the geophones were moved down along the radius of curvature of the wavefront, as indicated by the lines drawn from the point 9' until they reach positions upon the wavefront 14 as drawn in the diagram, they would all receive this particular reflection at the same instant, but this effect would result only when the waves arrive from this one direction. If the waves have been phonographically recorded, however, and the pickup heads corresponding to the various tracks of the record have been moved along the record for a distance corresponding to the time required for the waves to travel from the wavefront, as shown, to the geophones, the same result, electrically, would be achieved.

The apparatus diagrammed in Fig. 1 is designed to accomplish this result. In this case a group of phonographic records, comprising a group of parallel variable density photographic sound tracks 2, are mounted adjacent the end of a fluorescent screen 4 of a cathode ray tube 6 of well known type. The device is adapted to scan all of the sound tracks by the sampling method, i. e., the cathode ray beam is deflected in two dimensions across the field occupied by the records 2, traversing the length of the record, or a predetermined portion thereof, in a time which is proportional (but not equal) to the time required to make the original record. The sound tracks are preferably either directly contiguous or are separated by narrow bands of opaque or substantially opaque emulsion.

The system of scanning the record is substantially that of "flying spot" scanning in television, the constant illumination from the point of contact on the fluorescent screen being modified by the density of the film so that the light passed by the film is proportional to the instantaneous amplitude of the original seismic wave which was used to form the track. The light passed by the record is focused by an optical system symbolized by the lens 8 upon the cathode of a photocell 10. The output of the photocell is fed to an amplifier 12, and the amplified waves are applied to the vertical deflecting plates 13 of a cathode ray display tube 15.

The purpose of the apparatus is to trace upon the fluorescent screen 16 of the tube 15 a wave of the same general type as is provided by the usual seismogram; i. e., a wave whose horizontal axis is proportional to time and whose vertical axis represents the relative instantaneous magnitude of the wave at its various phases. It is desirable, moreover, that this wave remain steady, so that it may be examined in the same manner as may a permanent record. This requires that the vertical movement of the scanning beam of tube 6 be correlated with the horizontal movement of the beam across the fluorescent screen 16 of tube 15. This is achieved by the use of a common master oscillator 17. In order to secure a reasonable degree of steadiness of the oscillographic trace, it should be repeated within the period of the persistence of vision, or at a rate something higher than sixteen times per second. Master oscillator 17 may therefore conveniently have a frequency of from twenty to thirty cycles per second, although this range is not critical and either higher or lower frequencies may be used if desired.

The output of the master oscillator 17 is fed to a pulse generator 19 which supplies a synchronizing pulse to hold in phase a time base sawtooth oscillator 21. Output of the latter is applied across a resistor 23, the high potential end of which connects to one of the vertical deflecting plates 25 of the tube 6. The low potential end of the resistor connects through a potentiometer 27, connected across a potential source 29, to ground, the purpose of the potentiometer arrangement being to center the cathode ray beam at the proper point on the field to be scanned. The high potential end of the resistor 23 is also connected to one of the horizontal deflecting plates 31 of display tube 15. The other horizontal deflecting plate 31' is connected to ground through a centering potentiometer 35 across a potential source 37.

The potentials required for deflecting the scanning beam of tube 6 across the records 1 is supplied by a horizontal saw-tooth wave oscillator 39. The frequency of the latter is determined by a number of considerations. It is desirable that it should be possible to scan the entire length of the records made from a single explosion. Recordable earth movements following such an explosion may persist for as much as six seconds, although four seconds is more usual. The significant frequencies recorded will range between ten and two hundred cycles per second, with the lower frequencies usually being the more important. In using a sampling technique each cycle of the highest frequency to be considered must be sampled several times; at least four and preferably more.

Assuming that the highest significant frequency is two hundred cycles per second, and the duration of the record six seconds, this gives a maximum of twelve hundred cycles to be scanned, and assuming that each of these twelve hundred cycles must be sampled six times, the scanning beam must be deflected horizontally seventy-two hundred times during each vertical deflection of the beam. Having assumed a frequency of, say, twenty cycles per second for the master oscillator 17, this would require that oscillator 39 operate at a frequency of one hundred forty-four thousand cycles per second. It is to be understood that this figure is merely illustrative and represents extreme conditions. In many instances it is desired to examine only a portion of the phonographic records, and both the six second period and the two hundred cycle maximum are extreme values. Very much lower frequencies than that indicated here may therefore be used satisfactorily in many instances.

The output of the horizontal oscillator 39 is fed to a potentiometer 40, provided with a contact arm 41 which connects to a horizontal deflecting plate 43 of the scanning tube 6. The other horizontal deflecting plate 43' connects through a potentiometer 45 and potential source 47 to ground, so that by adjustment of the potentiometer arm 41 and potentiometer 45 the scanning beam may be adjusted to traverse accurately the field of the records 2.

Potentiometer 40 is also provided with two additional potentiometer arms 49 and 49', which are preferably mechanically coupled as indicated by the dotted connection 51 between them, so that they are movable together to pick off slightly different portions of the potential across potentiometer 40. Arms 49 and 49' connect respectively to gate-buffers 53 and 53'. These buffers may be cathode followers provided with gating electrodes, by which they may be cut off. Their outputs are connected in parallel across a resistor 55, one end of which is connected to the low potential end of resistor 23, while the other is connected to the second vertical deflecting plate 25' of tube 6.

The pulses developed from the pulse generator 19, besides synchronizing the time base oscillator 21, are also fed to a gate generator 57. The latter may, for example, be a multi-vibrator, which generates a square waveform which reverses in potential at each pulse provided by the pulse generator 19. The gate-buffers 53 and 53' are connected to the gate generator in opposite phase, so that a positive pulse is fed to buffer 53, opening its gate, during the first half of the wave from gate generator 57, while a negative pulse applied to gate 53' closes its gate, the operation being reversed during the next half cycle of generator 57 which corresponds to the succeeding scanning of the records 2.

As a result of the connections just described a portion of the output of horizontal oscillator 39 is fed across the vertical deflecting plates of the tube 6. Accordingly the scanning spot, instead of being deflected directly across the group of records 2 and sampling them in the same time relation at which they were recorded, will be deflected either upwardly or downwardly as it traverses the successive tracks.

Assuming that these tracks have been recorded from top to bottom of the record as shown, a downward deflection will cause the last track to be scanned at an earlier epoch than it would have been had the deflection been substantially horizontal; similarly, an upward deflection will delay the later track to be scanned relative to the earlier. Since the arrangement of the tracks is optional and the times considered are relative, it will be realized that "advance" and "delay" are exact equivalents. Since in certain other embodiments of the invention a delay is more readily accomplished than an advance, the term "delay" will hereinafter be used to describe this general procedure.

Figure 2:
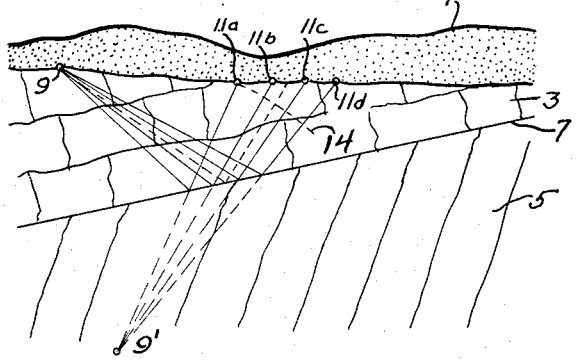
Fig. 2 is a diagram of a shot point, a plurality of geophones, and a reflecting interface, for illustrating the relationship between the angle of arrival of a wavefront at a reflecting surface, the time of such arrival at the various geophones, and the location of the reflecting surface.

Considering Fig. 2, it will be seen that the arrival of the wavefront 15 at geophone 11d is delayed with respect to its arrival at geophone 11a. If, now, in scanning the records, the scansion of the track recorded from geophone 11a is delayed by an equal amount while the tracks recorded from geophones 11b and 11c are delayed proportionally, the waves as reproduced upon the fluorescent screen 16 will be brought into phase and will form a single smooth curve.

The effect of the operation as viewed upon the screen is illustrated diagrammatically in Figs. 3a to 3c. For illustrative purposes only the wave is assumed to be a single cycle of a sine wave, and it is also assumed that the sound tracks are nearly contiguous so that there is a minimum gap between the samplings of the successive tracks. The figure also assumes that the waves are delayed by 18° as between successive geophones.

As such waves are sampled, i. e., as the scanning spot traverses the successive sound tracks, there will be generated a series of short pulses for each track scanned, and these pulses will appear upon the fluorescent screen 16 as a series of short dashes of light. Collectively, the successive dashes referrable to each track will trace a dashed sine curve, these curves being illustrated in Fig. 3a by the curves 61a to 61d inclusive if no component of the horizontal scanning frequency is introduced into the vertical deflecting field. In the case illustrated, using a simple sine wave, the wave form of the collective traces can be recognized. If, however, the delay of the later arriving waves were greater, or the waves were more complex in form, the result might well be so confusing that the waveforms could not be recognized at all. In the practical case, where there is noise mixed with recorded waves, identification of waveform would be even more difficult.

Introducing a portion of the horizontal scanning component in the right direction brings the waves more closely together, and as the proper relative delays are approached the waves illustrated in Fig. 3a come closer together and the curves begin to assume a form somewhat as illustrated in Fig. 3b. When the right degree of delay is achieved the dashes merge to form a single smooth curve 61, as shown in Fig. 3c. An introduction of still further delay will result in a repetition of a trace of the type illustrated in Fig. 3b and, finally, of 3a, with the positions of the curves reversed.

If the waveforms as recorded on the various tracks were truly identical, and if the wavefront 15 were actually plane, instead of being curved, the identification of the point at which the various curves merged would be relatively easy. Mention has already been made, however, of the effective interferent noise, and the wavefront is curved, although the curvature is slight in the usual practical case. The best adjustment of either one of the potentiometers 49 is therefore an approximation and, to some degree, a matter of judgment. The use of the dynamic scanning principle of this invention is to minimize the errors resulting from these effects.

It has been pointed out that the potentiometer arms 49 and 49' are adjusted so as to take off very slightly different proportions of the potential from the horizontal oscillator 39. Alternate presentations of the resulting waveforms upon the screen 16 will therefore differ in some slight degree, and since the presentations occur alternately and in rapid succession, they flicker in a manner which enables them to be compared very readily. Some operators find that they can make the adjustment more accurately by bringing one or the other of the alternate presentations to optimum value, using the other for purposes of comparison. Other operators find that best results ensue from obtaining equal deviations on the two sides of the norm. In either case the direction of arrival of the waves can quickly be determined.

An embodiment of the invention utilizing the same principle but entirely different techniques is illustrated in Fig. 4. In this instance the scanning is accomplished mechanically, by the means of a constant speed motor 70 turning a shaft 71 upon which is mounted a drum 73 of transparent material, around the periphery of which is wound the record 75, which, as before, comprises a plurality of parallel tracks.

Mounted within the drum is an exciter lamp 77, which, shining through the film, excites the photocells of a multi-channel pickup 79. In this case the type of record used is not of particular importance, since, with appropriate changes in the detailed mechanism, it can be a variable area photographic record, a magnetic record, or a mechanical one, since each track is scanned in its entirety instead of being sampled as in the previous case. The scanning of each record should, however, take place in the same interval as in the embodiment previously described, and therefore the motor speed should be approximately twenty revolutions per second or twelve hundred R. P. M.

The shaft 71 is divided by an insulating coupling 78, beyond which it carries the rotating arm 80 of a potentiometer 81, and a pulley 83 driving a belt 85 of a medium suitable for making magnetic recordings, such as steel or of plastic coated with magnetic oxides. The belt runs over an idler pulley 87.

Each channel from the multi-channel pickup 79 connects, via cable 88, to a pair of magnetic recording heads 89. The heads of each pair are shown as connected in series, but they may equally well be connected in parallel. For reasons which will later become apparent the heads of each pair are mutually displaced longitudinally along the magnetic belt 85, so that the simultaneously made recordings are similarly displaced along the belt. These recording heads will be hereinafter referred to as the "upper" and "lower" heads, although in actual apparatus the belt may have any disposition whatever.

Mounted farther along the belt in the direction of its motion is an arm 91, carrying a group of magnetic pickup or reproducing heads 93, positioned in alinement with the tracks produced by the upper recording heads 89. The arm 91 is pivoted to the frame 94 of the device, as shown schematically at the reference character 95. It will be seen that by swinging the arm 91 up or down the reproduction of the various tracks may be advanced or delayed relatively to the track at the right of the figure, so as to advance or delay the waves as reproduced by the heads 93 in much the same manner as delay or advance is accomplished in the form of the device first described. In this case, however, the heads are all connected in parallel, so that the wave in the combined output circuit 97 is the sum of all of the tracks. Actually a more elaborate arrangement than that shown is required, in order to keep the reproducing heads accurately alined with each of the tracks as the arm is swung. Such an arrangement is, however, easily accomplished by well known mechanical methods, and is omitted from the drawing as it would serve merely to confuse it.

Mounted below the arm 91 on the frame 94 is a second arm 99 carrying a group of recording heads 101, also connected in parallel to a circuit 103. These latter heads are spaced along the arm at the same intervals as the heads 93, but the arm is so mounted that the heads may be alined with the tracks from either the upper or lower heads 89. The pivot 105 of arm 99 is also movable longitudinally of the tracks, so that when alined laterally with the lower heads 89 and spaced along the tracks below arm 91, the outputs of heads 93 and 101 are identical and in phase.

The outer ends of arms 91 and 99 are pivoted to a bar 107, the pivot 109 of arm 91 being fixed while pivot 111 of arm 99 is adjustable longitudinally of the tracks so that both spacing and angle of arm 99 are adjustable with respect to arm 91. Finally bar 107 is adjustable vertically, so that the angles of arms 91 and 99 across the tracks are adjustable together simultaneously, the angles being either the same or slightly different.

A third arm 99', identical with arm 99, can be mounted below the latter. The appurtenances of arm 99', being the same as those of arm 99, are identified by the same reference characters, distinguished by accents.

Again it must be understood that the showings of the diagram are purely schematic, and that in practice sliding cross heads would be provided to permit the motions indicated, but the necessary mechanical expedients are so well known that detailed showings are not considered necessary.

The provision of double recording heads is not always necessary; it is advisable, however, to permit in-phase pickups in two circuits and avoid mechanical interference between the reproducing heads. With a single recording head in each circuit it is not possible to examine very short lambda corrections, but with multiple recordings displaced both laterally and longitudinally, and with three sets of pickups, almost any parameters can be compared.

A set of erasing heads 113 is also provided for each track, and these erasing heads are preferably operated continuously so that a fresh record is made at each revolution of the belt; the records are picked up immediately after being made, and are then erased. The magnetic belt therefore acts merely as a storage, delay, or memory device.

The circuits 97, 103 and 103' connect, respectively, through adjustable filters 114, 114' and 114", across potentiometers 115, 115' and 115", which act as gain or volume controls for gate-buffers 117, 117', 117". These may be the same type as that described in connection with the embodiment of Fig. 1. The outputs of the gate-buffers feed into a mixer 119, which is connected to apply the combined outputs of the various reproducing heads across the vertical deflecting plates 121 of a cathode ray display tube 123.

The horizontal deflecting plates 125 of the display tube are connected between one end of the rotary potentiometer 81 and its contact arm 80, a potential source 127 being connected across the potentiometer, a saw-tooth deflecting wave thereby being generated and applied across the deflecting plates of the display tube.

Motor shaft 71 also carries a contactor 129 which engages a fixed contact 131 at each revolution of the motor and generates a pulse which triggers a gate generator 133. The gate generator supplies a rectangular output wave in positive and negative phases to a circuit 135. Switches 137, 137' and 137'' are contacted so that the gating impulses can be applied, in either phase, to any of the buffer gates 117, 117' and 117''.

This organization of equipment is considerably more flexible than that first described. It will readily be apparent that if arm 99' be so adjusted that the pickup at its right is the same distance below the pickup at the right of the arm 91 as is the lower recording head 89 below its corresponding upper recording head, and if the two arms are set so that they are not exactly parallel, but that arm 99 makes, say, a slightly greater angle across the magnetic belt than does arm 91, and if the switches 137 and 137'' be set so as to apply the gating impulses in opposite phase to the gates of the buffers 117 and 117'', the effects of slightly different delays with respect to the outputs referrable to the different geophones can be compared.

The present device, however, enables other useful comparisons to be made. For instance, the switch 137 may be set to contact its central point, permanently opening the gate of the buffer 117 by the application of a potential from the source 141, while switches 137' and 137'' are set to apply the gating potentials in opposite phase to buffers 117' and 117''. Arms 99 and 99' may now be set parallel to arm 91, but in such position as to give slightly different delays. The effect of different values of the lambda correction can thus be compared, and, by adjusting the potentiometers 115' and 115'' the optimum value of the delta correction can also be determined. As has already been stated, these values may differ for different parts of the record. The effects of different filtering operations may be compared in like manner.

It should be evident from the difference of the two forms of the invention illustrated that many other embodiments of the device are possible, and that the effects of varying other scanning parameters can be compared. By adding somewhat to the complexity of the device it is possible to compensate for the second order errors, due to curvature of wavefronts, which have already been mentioned. The trains of waves generated between the switching operations accomplished by the gates need not be limited to a single scanning of each of the tracks, but, in order to change the flicker period to one more readily appreciated by the eye, each train of waves may be two, three, or more traversals of the sound tracks. The method has a wide use in geophysical analysis, and the protection desired for the invention is limited only as such limitations are expressed in the following claims.

What is claimed is:

1. Apparatus for analyzing data recorded on a phonographically reproducible record comprising means for producing a series of trains of electrical waves dimensionally related to said recorded data, means for producing a second series of trains of waves having a different dimensional relation to said data, oscilloscopic means for displaying curves representative of said trains of waves, and means for alternating between said two series the trains of waves displayed.

2. Apparatus in accordance with claim 1 wherein said oscilloscopic means comprises a cathode ray tube.

3. Apparatus in accordance with claim 1 including means for producing in said first and second mentioned series of electrical waves mixed waves from a plurality of phonographically recorded tracks.

4. Apparatus in accordance with claim 1 including means for delaying waves in said second series relatively to corresponding waves in said first series to produce said different dimensional relation.

5. Apparatus in accordance with claim 1 including means for changing the amplitude of one of said series of waves with respect to the amplitude of the other series.

6. Apparatus for analyzing seismic geophysical data in the form of a plurality of phonographically reproducible tracks simultaneously recorded, which comprises an oscilloscope including a display surface and an index electrically movable in two dimensions thereover, a time base generator of electrical waves connected to deflect said index repeatedly across said surface in one dimension, means for repeatedly scanning at least a portion of all of said tracks, the periods of repetition of said time base generator and said scanning being substantially equal and sufficiently short so that all portions of the trace of said index appear substantially as if simultaneously displayed, means responsive to said scanning means for producing a train of electric waves corresponding to the recorded seismic waves combined in one relationship, means for producing a second train of electric waves corresponding to said seismic waves combined in a different relationship, and switching means for connecting said trains alternately, in successive periods of said time base generator, to deflect said oscilloscope index in a second dimension.

7. Apparatus in accordance with claim 6 wherein said wave train generating means include means for varying the relative time sequence of the portions of said waves corresponding to the various tracks.

8. Apparatus in accordance with claim 6 wherein said wave train generating means includes means for varying the relative amplitude of the portions of said waves corresponding to the various tracks.

9. The method of analyzing geophysical data recorded on phonographically reproducible records which includes the steps of generating from said records successive trains of electrical waves, modifying the dimensional relationship of alternate trains in such succession to the recorded data and the remaining trains of the succession, and oscillographically comparing the trains so generated.

10. The method in accordance with claim 9 wherein each train of waves is generated in a period short in comparison with the time wherein said waves were originally recorded.

11. The method in accordance with claim 9 wherein the period within which each train of waves is generated is approximately equal to the period of persistence of vision as a result of which differences between oscillographic traces of successive waves appear as a flicker.

12. The method of analyzing geophysical data recorded on phonographically reproducible records which includes the steps of generating from said records successive trains of electrical waves, modifying the dimensional relationship of alternate trains in such succession to the recorded data and the remaining trains of the succession, generating a beam of cathode rays, generating a saw-tooth wave having a period equal to the length of each train of waves, and deflecting said cathode ray beam in one dimension by said saw-tooth wave and in another dimension by said trains of waves to produce successive different but comparable traces.

13. The method of analyzing geophysical data recorded as a plurality of phonographically reproducible record tracks which comprises the steps of generating from said record successive trains of mixed electrical waves corresponding to the combined recordings of said tracks, generating a beam of cathode rays, generating a saw-tooth wave having a period of substantially equal to the duration of each of said trains of electrical waves, deflecting said beam of cathode rays in one dimension by said saw-tooth wave and in another dimension by said trains of waves, and altering the parameters of said deflecting waves in successive cycles of said saw-tooth waves.

LU GARDA RIEBER,
*Executrix under the Last Will and Testament of Frank Rieber, Deceased.*

REFERENCES CITED

The following references are of record in the file of this patent:

UNITED STATES PATENTS

| Number | Name | Date |
|---|---|---|
| Re. 22,672 | Shumard | Aug. 28, 1945 |
| 2,037,577 | Harries | Apr. 14, 1936 |
| 2,098,695 | Southwick | Nov. 9, 1937 |
| 2,171,216 | Koch | Aug. 29, 1939 |
| 2,172,395 | McSpadden | Sept. 12, 1939 |
| 2,368,449 | Cook | Jan. 30, 1945 |
| 2,394,196 | Morgan | Feb. 5, 1946 |
| 2,426,979 | Ayres | Sept. 9, 1947 |
| 2,471,530 | Lobel | May 31, 1949 |
| 2,483,140 | Higham | Sept. 27, 1949 |
| 2,484,618 | Fisher | Oct. 11, 1949 |
| 2,513,176 | Homrighous | June 27, 1950 |